United States Patent [19]

Hopkins

[11] 3,946,475

[45] Mar. 30, 1976

[54] CUTTING INSERT LOCKING MEANS

[75] Inventor: David Alan Hopkins, Detroit, Mich.

[73] Assignee: The Valeron Corporation, Detroit (Oak Park), Mich.

[22] Filed: Feb. 27, 1975

[21] Appl. No.: 553,661

Related U.S. Application Data

[63] Continuation of Ser. No. 441,021, Feb. 11, 1974, abandoned.

[52] U.S. Cl. ............................ 29/105 R; 29/105 A
[51] Int. Cl.² ........................................ B26D 1/12
[58] Field of Search ...................... 29/105 R, 105 A

[56] References Cited
UNITED STATES PATENTS

| 3,188,717 | 6/1965 | Heinlein | 29/105 R |
| 3,217,384 | 11/1965 | Wirfelt | 29/105 A |
| 3,309,758 | 3/1967 | Williams | 29/105 R |
| 3,405,433 | 10/1968 | Williams | 29/105 R |

*Primary Examiner*—Leonidas Vlachos
*Attorney, Agent, or Firm*—Farley, Forster and Farley

[57] ABSTRACT

The invention pertains to the field of cutting tools having indexable replaceable cutting inserts and comprises novel means for locating and locking the individual inserts in place with assurance that the inserts are accurately positioned and firmly held with particular advantage in simplicity and economy of construction. The locking means comprise fastening means engaging the tool body and engaging an extended slidable insert bottom seat anvil such that upon actuation the bottom seat anvil is drawn axially, radially and circumferentially relative to the tool body thereby simultaneously drawing the cutting insert retained on the bottom seat anvil into tight engagement with two insert side locating surfaces formed on the tool body and drawing the bottom seat anvil into tight engagement with the tool body.

17 Claims, 8 Drawing Figures

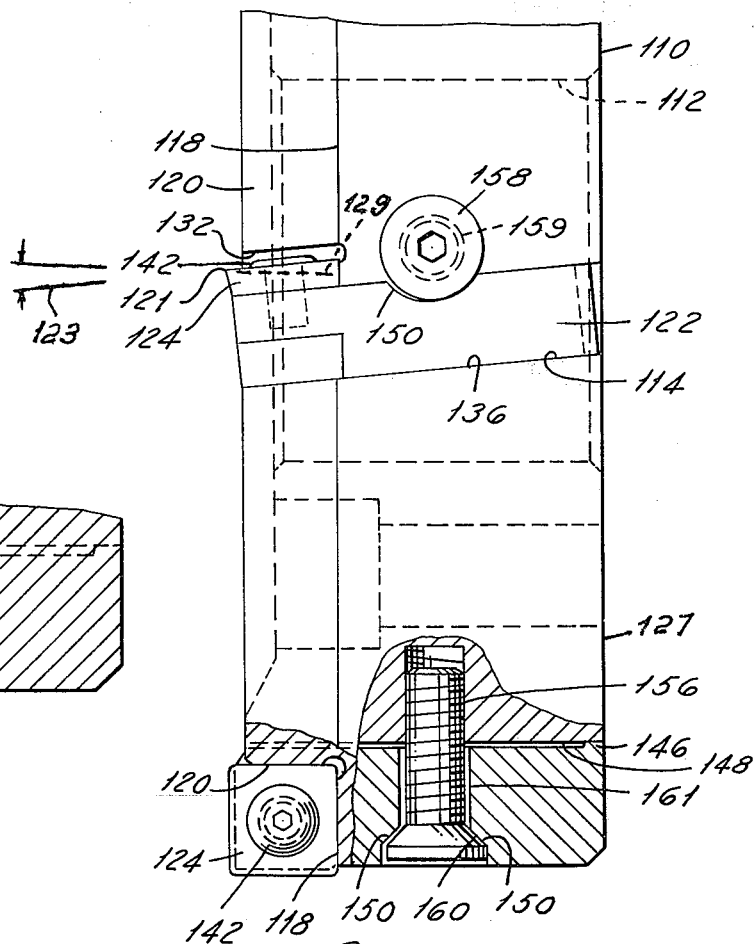
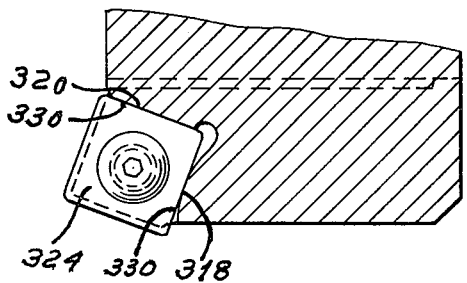
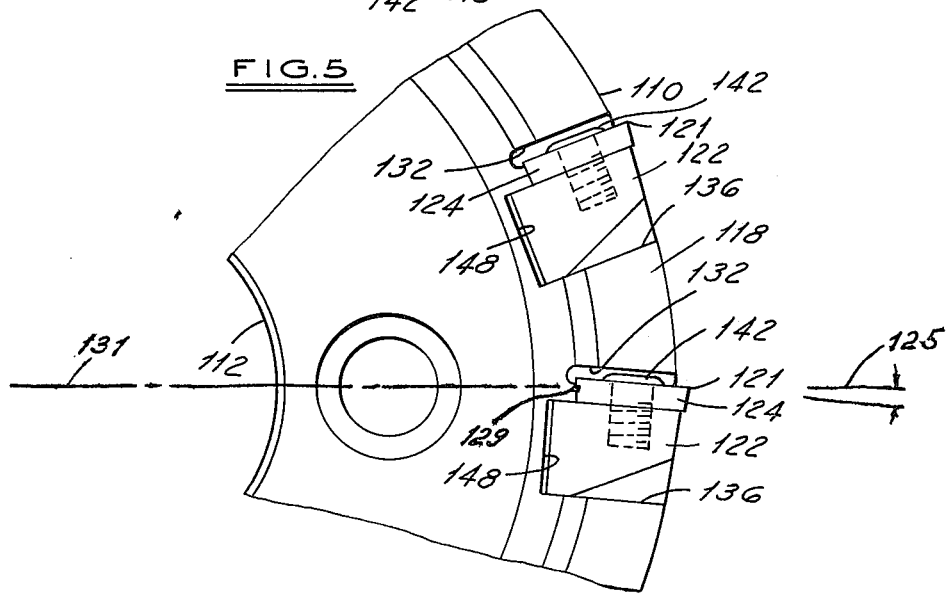

CUTTING INSERT LOCKING MEANS

This application is a continuation of application Ser. No. 441,021 filed Feb. 11, 1974, and now abandoned.

BACKGROUND OF THE INVENTION

The invention pertains to the field of cutting tools such as turning, boring and milling cutters having replaceable indexable cutting inserts mounted on a tool body. Frequently a plurality of indexable inserts are located about the end of a cylindrical body although such tools can be made with a single insert. Such tools are typified by U.S. Pat. No. 3,309,758 which discloses a serrated bottom seat anvil adapted to draw an insert axially into place or alternatively a bottom seat anvil fixed in place. The inserts must be indexable and replaceable in the simplest and quickest manner possible commensurate with the reproduceable accuracy required.

SUMMARY OF THE INVENTION

The invention comprises means for retaining indexable cutting insert in the cutting tool pocket by means of a bottom seat anvil on which the insert is indexably attached and a locking fastener which draws the anvil to position the insert in three planes axially, radially and circumferentially relative to the tool. Two sidewalls of an insert are tightly drawn into engagement with insert side locating surfaces formed in the tool body member in two intersecting planes. Simultaneously the anvil is forced into tight engagement with a third seating wall of the body in a plane intersecting the other two intersecting planes. In one preferred embodiment the locking means comprises a threaded fastener having a conical surface point thereon and complementary threaded and conical surfaces formed in the body and anvil. The engaging surfaces in the body and anvil however are axially offset such that when the fastener is tightened the anvil is drawn in a direction oblique to all three intersecting planes. In another embodiment a cap screw is positioned to draw the anvil in such direction.

The mechanical configuration of the tool body and anvil are extremely economical to produce thereby providing a very economical tool to manufacture. Exceptionally good accuracy when the inserts are indexed or replaced results from the two locating surfaces formed in the body member and the insert drawn thereagainst.

DESCRIPTION OF THE DRAWINGS

FIG. 4 is a side elevation of a second embodiment of the invention;

FIG. 5 is a partial end elevation of FIG. 4;

FIG. 6 is a partially cutaway fragmentary side elevation showing an alternative sidewall engagement for a milling cutter embodying the invention;

DESCRIPTION OF THE PREFERRED EMBODIMENT

Figure 1:
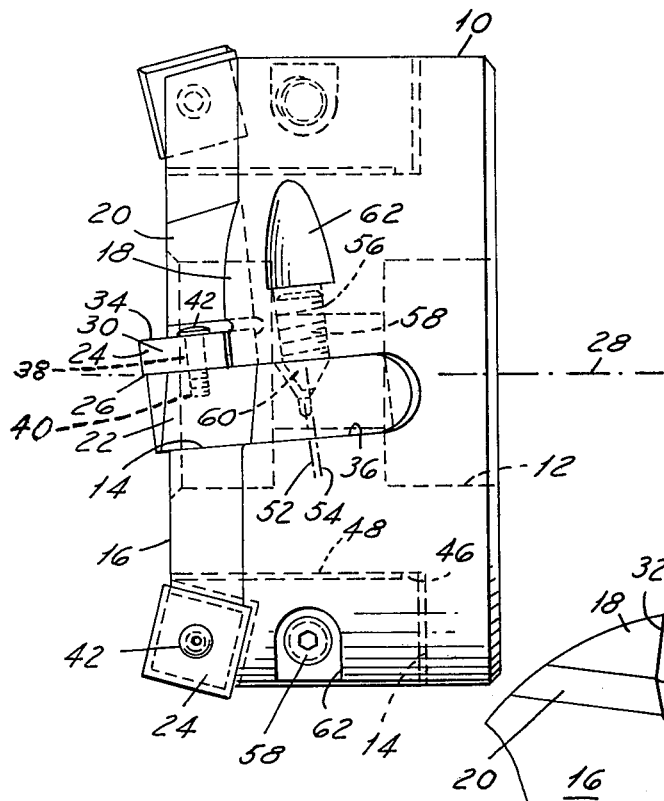
FIG. 1 is a side elevation of a milling cutter embodying the invention.
Figure 2:
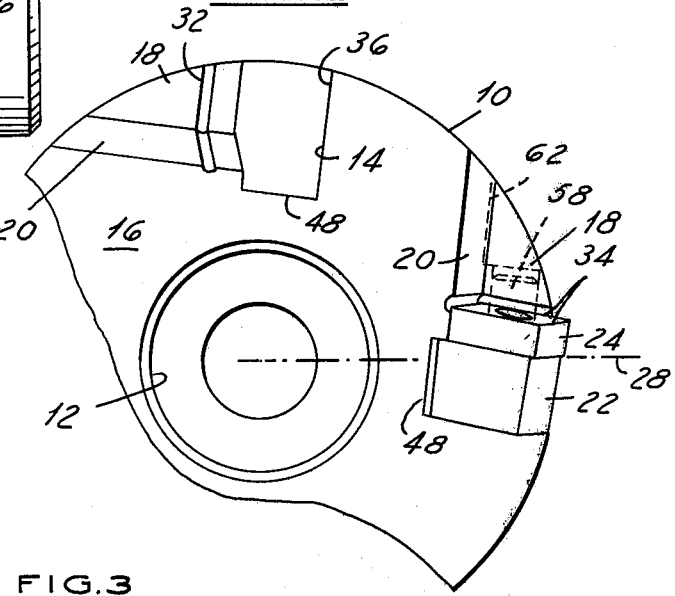
FIG. 2 is an end elevation of FIG. 1.
Figure 3:
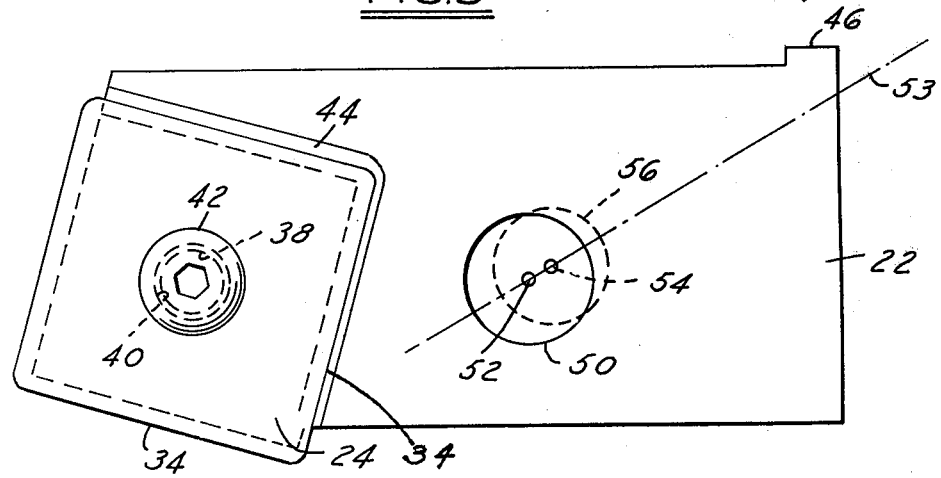
FIG. 3 is an enlarged plan view of a bottom seat anvil with an insert attached thereon.

In FIGS. 1 through 3 a substantially cylindrical body 10 includes a suitable shouldered bore hole 12 for mounting on a spindle (not shown). The body 10 has a plurality of slots 14 formed in the periphery and extending substantially axialy from the front face 16. Intersecting the slot 14 are two planar insert side locating surfaces 18 and 20 which in combination with a bottom seat anvil 22 inserted in the slot 14 determine the geometrical position of a negative rake indexable replaceable insert 24. More particularly, the axial and radial rake angles selected for the cutting purpose of the tool will determine the angular position of the anvil 22 and slot 14 relative to an axial plane through the tip of the bottom seat at 26, the axial plane being given by 28. The 0° relief angle of the sidewalls 30 of the insert 24 will then in turn determine the geometric locations of the planes 18 and 20 thereby exactly locating the insert 24 each time it is indexed or replaced. A groove 32 as shown best in FIG. 2 is formed in planes 18 and 20 to prevent contact of insert cutting edges 34 and to provide relief for build up on used insert cutting edges thereby assuring proper seating of the insert sidewalls 30 against the planes 18 and 20. The bottom seat anvil 22 locates against the seating wall 36 of the slot 14. The insert 24 includes a central hole 38 and the anvil 22 includes a concentric threaded hole 40 for a center screw 42 that retains the insert on the anvil. The anvil 22 also includes a relief groove 44 to prevent contact of the cutting edges bounding the opposite face of the insert 24. A similar milling cutter for positive rake inserts would not require the relief groove 44 in the anvil since the cutting edges are only formed on one face.

The anvil 22 includes a small protrusion 46 which abuts the bottom 48 of the slot 14 and a conical depression 50 with centerline 52. The centerline 52 is offset from the centerline 54 of a threaded hole 56 in the body 10. Inserted in the threaded hole 56 is a set screw 58 having a conical nose 60 that bears against the offset conical depression 50 in the anvil 22. Since the centerlines 52 and 54 are offset along the diagonal line 53, as is best shown in FIG. 3, actuation of the screw 58 draws the anvil 22 radially and axially inward towards the axis of the body 10. The anvil 22 will tend to move to the right and simulaneously rotate clockwise about the protrusion 46. This motion causes the sidewalls 30 of the insert 24 to tightly engage the insert side locating surfaces 18 and 20 and simultaneously the conical nose 60 will depress the anvil 22 tightly against the slot seat 36 under the insert 24. A depression 62 is formed in the outer surface of the shank member 10 for access to the head of the screw 58. Typically the head will have a hexagonal socket formed therein.

In FIGS. 4 and 5, an alternative form of the tool is shown which may be used as a milling cutter or boring cutter. Similar elements are denoted by reference numbers corresponding to the first embodiment with the prefix 1 added. In this embodiment, positive rake inserts 124 are fastened by a center screw 142 to a bottom seat anvil 122 in turn inserted in a slot 114. The inserts 124 engage insert side locating surfaces 118 and 120. Both surfaces 118 and 120 extend concentrically completely around the perimeter of the body 110. In FIG. 4 the insert side locating surface 118 is planar and in planar engagement with a sidewall 130 of the insert 124 to provide a negative axial rake 123 equal to the relief angle of the insert. The negative radial rake 125 of the insert is established by positioning the anvil 122 to provide the radial rake desired at the cutting tip 121 compatible with the clearance angle on the insert and non-engagement of the cutting edge. Thus, the side locating surface 118 and bottom seat 122 position accommodate the rake angles of the insert. The axial distance from the back face 127 of the body 110 to the cutting tip 121 is the critical dimension for the tool of FIG. 4. Thus the tolerances of the tool are only dependent upon the tolerances at a single location (surface 118) and superior reproducible accuracy results when the inserts are indexed or replaced. The surface 120 is usually very slightly conical and engages a sidewall 130 with line contact 129 in a diametral plane 131 through the cutting tip 121 to determine the overall cutting diameter.

The threaded locking screw 158 is located substantially perpendicular to the location in the first embodiment. As is best shown in FIG. 4, the locking screw 158 engages a threaded hole 156 in the body 110. A conical locking surface 160 is formed on the underside of the head of the locking screw 158. This locking surface 160 engages a partial truncated conical surface 159 in the body and concentric with the threaded hole 156. The bottom seat anvil 122 also includes a truncated complementary partial conical surface 150 having its centerline axially offset from the centerline of the hole 156 and partial conical surface 159. Sufficient clearance 161 is provided in the anvil 122 for the threaded shank of the screw 158. Locking actuation of the screw 158 will cause contact of the conical surface 160 with both partial conical surfaces 159 and 150, thus drawing the bottom seat anvil 122 radially and axially down into the slot 114, and drawing the anvil circumferentially against the slot seating wall 136, and thereby drawing the insert sidewalls 130 into tight engagement with the side insert locating surfaces 118 and 120. A thread direction of the screw 158 is preferably provided so that frictional drag will assist the seating direction of the anvil movement.

FIG. 6 shows a modification for finish boring or rough milling. Corresponding parts are denoted with reference numbers corresponding to the first embodiment with the prefix 3 added. The critical dimension is the radial position of the insert 324. The insert locating surface 320 is conical to provide line contact with the insert sidewall 330 along a diametral plane. The insert locating surface 318 is crowned as shown greatly exaggerated to provide point contact with another insert sidewall 330. This construction accommodates tolerances in the angularity of adjacent cutting edges, i.e., in the squareness of the insert and thereby allows greater positioning accuracy for the insert. Such a construction is directed to finish boring where the chip loading forces in the direction of the crowned surface are relatively low and maximum radial accuracy is required. Alternatively, the extended support provided by the surface 320 allows rough milling with the tool.

Figure 7:
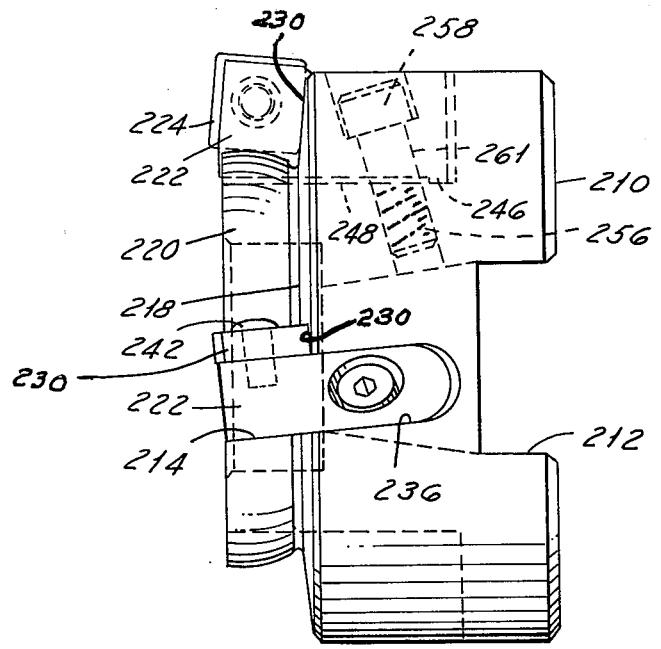
FIG. 7 is a side elevation of a third embodiment of the invention.
Figure 8:
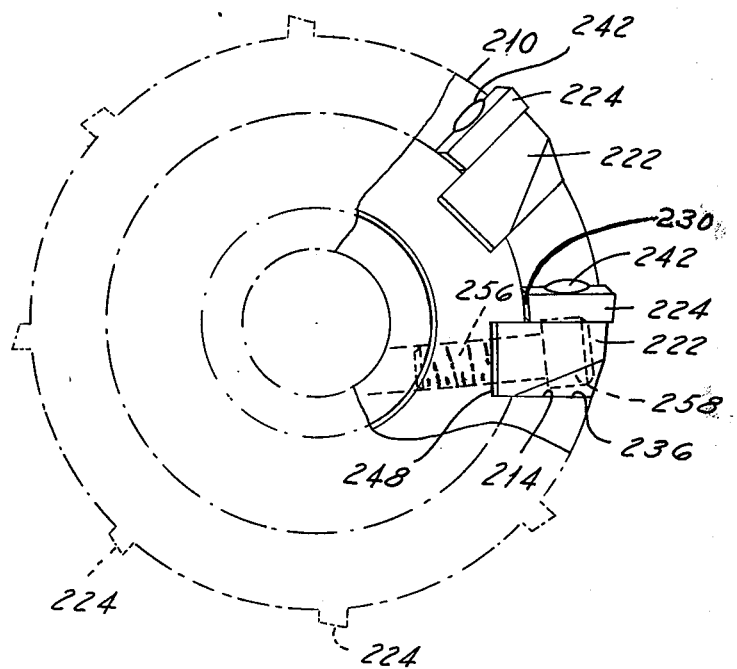
FIG. 8 is a partial end elevation of FIG. 7.

In FIGS. 7 and 8 a third form of the tool which also may be used as a milling cutter or boring cutter is shown. Corresponding parts are denoted with reference numbers corresponding to the first embodiment with the prefix 2 added. A plurality of square positive rake cutting inserts 224 engage side locating surfaces 218 and 220 which position the inserts 224 at a negative axial and negative radial rake. As above, each insert 224 is fastened to a bottom seat anvil 222 by a center screw 242. The anvil is fitted in a slot 214 and includes a projection 246 abutting the bottom 248 of the slot 214.

A cap screw 258 engages a threaded hole 256 in the body 210. The head of the cap crew 258 engages the anvil 222 in a shouldered hole 261 and is angularly positioned as shown. Upon tightening actuation the anvil 222 is drawn axially and radially inward and circumferentially downward toward the slot seating wall 236 to firmly seat the insert side walls 230 against the side locating surfaces 218 and 220 as well as to seat the anvil 222 against the slot seating wall 236. Thus, the movement of the anvil 222 is substantially the same as in the previous embodiments described above. However, the conical engaging surfaces are not required in this particular embodiment.

In FIGS. 7 and 8 the side locating surface 218 is conical and the side locating surface 220 is a crowned surface of revolution. This construction is suited to finish milling and rough boring. Line contact along a diametral plane by surface 218 with an insert sidewall 230 is provided to accurately support the insert 224 in the axial direction. Radial support is provided by the point contact of the crowned surface 220 with another sidewall 230 thereby accommodating insert angularity tolerances as in FIG. 6. Thus the surface 218 provides accurate location for finish milling and adequate support for rough boring operations.

The locking actuation in a direction oblique to the three relevant locating planes assures that each insert will be drawn into an accurate position repeatedly. It will be clear to those skilled in the art that this tool body construction can be economically machined with simple set up and extreme accuracy in relative pocket location. The combination assures a highly versatile tool of low cost.

I claim:

1. An indexable polygonal insert cutting tool comprising;
   a tool body,
   said body having a pair of insert side locating surfaces,
   a slot formed in said tool body adjacent said surfaces,
   a bottom seat anvil in said slot projecting between said surfaces,
   means to retain an insert on said anvil,
   and locking means adapted to retain said anvil in said slot with an insert thereon in engagement with said side locating surfaces,
   said locking means including means urging said anvil with a resultant line of force having a direction oblique to each of said surfaces and bottom seat to simultaneously forceably locate said insert relative thereto.

2. The cutting tool of claim 1 wherein said locking means includes threaded engaging means and conical engaging means adapted to exert a force of said anvil in said oblique direction.

3. The cutting tool of claim 1 wherein said locking means includes a shouldered engaging surface in said anvil, threaded engaging means in said body, and threaded fastening means engaging said threaded engaging means and said shouldered surface having a thread axis extending in said oblique direction.

4. An indexable polygonal insert cutting tool comprising;
   an annular tool body,
   said body having a pair of insert side locating surfaces for each of a plurality of inserts,
   a slot formed in said tool body for each of said inserts adjacent said surfaces, a bottom seat anvil in each slot projecting between said surfaces, means to retain an insert on each anvil, and locking means adapted to retain each anvil in said slot with an insert thereon in engagement with said side locating surfaces, said locking means including means urging said anvil with a line of force having a direction oblique to each of said surfaces and bottom seat to simultaneously forceably locate said insert relative thereto.

5. The cutting tool of claim 4 wherein said insert side locating surfaces comprise surfaces of revolution formed in said body, said surfaces of revolution forming a groove intersecting said slots.

6. The cutting tool of claim 4 wherein one of said insert side locating surfaces comprises a conical surface.

7. The cutting tool of claim 6 wherein said conical insert side locating surface provides line contact with an insert sidewall, and the other insert side locating surface is crowned for point contact with another sidewall.

8. The cutting tool of claim 4 wherein said side locating surfaces comprise intersecting planar surfaces.

9. The cutting tool of claim 8 wherein said locating surfaces and anvil are adapted for negative rake inserts having 0° sidewall relief angle.

10. The cutting tool of claim 5 wherein one of said surfaces of revolution is a radial planar surface.

11. The cutting tool of claim 10 wherein said locating surfaces and anvil are adapted for positive rake inserts having sidewall area contact with said radial surface.

12. The cutting tool of claim 6 wherein said conical insert side locating surface extends in a nearly radial direction.

13. The cutting tool of claim 6 wherein said conical insert side locating surface extends in a nearly axial direction.

14. The cutting tool of claim 1 wherein one of said insert side locating surfaces provides extended contact with said insert and the other of said side insert side locating surfaces providing limited contact with said insert to accomodate angular conformation of said insert with said extended contact.

15. The cutting tool of claim 1 wherein said anvil is provided with limited contact means for engaging a wall of said slot extending normal to said bottom seat at a location remote from said side locating surfaces to accommodate angular positioning of said anvil on said bottom seat determined by engagement of said insert with said side locating surfaces.

16. An indexable polygonal insert cutting tool comprising;

an annular tool body, said body having a pair of insert side locating surfaces for each of a plurality of inserts, a slot formed in said tool body for each of said inserts adjacent said surfaces, a bottom seat anvil in each slot projecting between said surfaces, means to retain an insert on each anvil, and locking means adapted to retain each anvil in said slot with an insert thereon in engagement with said side locating surfaces, said locating surfaces comprising surfaces of revolution integrally formed in said annular body and coaxial therewith, one of said insert side locating surfaces being convexly curved in a plane parallel with the axis of revolution for central contact with a side of said insert, the other of said insert side locating surfaces providing for extended contact with another side of said insert.

17. An indexable polygonal insert cutting tool comprising:

a tool body, an insert pocket in said body having a pair of insert side locating surfaces in two intersecting planes, a slot formed in said tool body adjacent said pocket having a seating wall in a third plane intersecting said other two planes, a bottom seat anvil in said slot projecting under said pocket and seated on said wall, means to retain an insert on said anvil, and locking means adapted to retain said anvil in said slot in engagement with said wall with an insert thereon in engagement with said side locating surfaces, said locking means including means urging said anvil with a resultant line of force having a direction oblique to each of said three planes to simultaneously forceably locate said insert relative thereto.

* * * * *